(12) United States Patent
Meier

(10) Patent No.: US 8,195,237 B2
(45) Date of Patent: Jun. 5, 2012

(54) SYSTEM AND METHOD FOR AGGREGATING MULTIPLE RADIO INTERFACES INTO A SINGLE LOGICAL BRIDGE INTERFACE

(75) Inventor: Robert C. Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 865 days.

(21) Appl. No.: 11/840,751

(22) Filed: Aug. 17, 2007

(65) Prior Publication Data

US 2007/0280142 A1 Dec. 6, 2007

Related U.S. Application Data

(63) Continuation of application No. 10/807,757, filed on Mar. 24, 2004.

(51) Int. Cl.
*H04B 1/38* (2006.01)
(52) U.S. Cl. ....................................... 455/560
(58) Field of Classification Search .................. None
See application file for complete search history.

(56) References Cited

U.S. PATENT DOCUMENTS

| | | | |
|---|---|---|---|
| 6,014,406 A * | 1/2000 | Shida et al. | 375/133 |
| 6,229,538 B1 * | 5/2001 | McIntyre et al. | 715/734 |
| 6,452,910 B1 * | 9/2002 | Vij et al. | 370/310 |
| 6,807,179 B1 * | 10/2004 | Kanuri et al. | 370/395.31 |
| 6,901,275 B1 * | 5/2005 | Aoyagi | 455/574 |
| 2003/0061533 A1 * | 3/2003 | Perloff et al. | 714/9 |
| 2003/0167346 A1 * | 9/2003 | Craft et al. | 709/250 |
| 2004/0123011 A1 * | 6/2004 | Murayama et al. | 710/305 |

* cited by examiner

*Primary Examiner* — Nick Corsaro
*Assistant Examiner* — Joel Ajayi
(74) *Attorney, Agent, or Firm* — Tucker Ellis LLP

(57) ABSTRACT

In an example embodiment, a system and method for aggregating multiple wireless bridge interfaces into a single logical bridge interface. The system includes a master switch with multiple associated wireless modules. Each master switch wireless module selectively broadcasts an associated connection signal. The master switch has an associated aggregation port, which is in data communication with each of the master switch wireless modules and selectively routes data among the master switch wireless modules. The system also includes a slave switch with multiple associated wireless modules. Each of the slave switch wireless modules receives one associated connection signal and establishes a wireless data communication link with the broadcasting master switch. The slave switch also includes an associated aggregation port, which is in data communication with each of the slave switch wireless modules, selectively routes data among the slave switch wireless modules.

18 Claims, 3 Drawing Sheets

SYSTEM AND METHOD FOR AGGREGATING MULTIPLE RADIO INTERFACES INTO A SINGLE LOGICAL BRIDGE INTERFACE

CROSS-REFERENCE TO RELATED APPLICATIONS

This application is a continuation of U.S. patent application Ser. No. 10/807,757 filed on Mar. 24, 2004.

TECHNICAL FIELD

The present application relates generally to wireless networks and, more specifically to a protocol for aggregating multiple radio interfaces into a single logical bridge interface.

BACKGROUND

Local Area Networks (LANs) are widely used to provide interconnectivity between computers affiliated with a building or site. Typically, LAN's consist of multiple computers connected together by a hardwired network or system backbone. For example, a typical system backbone is an Ethernet or Token Ring based system. A server or host computer will also be connected to the backbone and serve as a central controller for the particular LAN. Multiple LAN segments are interconnected by devices called "bridges" or "switches".

Advances in technology have enabled LAN's to be used to interconnect wireless devices, such as laptop computers, personal data assistants and even Voice-over-Internet-Protocol telephones. In wireless networks, access points are connected to the LAN and provide for wireless interfacing of such portable wireless devices to the backbone.

Although connecting several computers or portable devices within a single building can readily be accomplished via the use of a LAN infrastructure, difficulties often arise when more than one building or site, needing connection to the infrastructure, are involved. In such cases, it may be desirable to have a single host computer or server provide all buildings or sites with interconnected services such as e-mail and group directories. In order to use a single server and enable communication between each building or site, some manner of interconnecting each LAN is needed.

One known method of interconnecting each LAN associated with a specified area is to physically make an additional hard wired connection between each LAN. Unfortunately, this method is expensive, time consuming and sometimes even not feasible. For example, a physical connection between buildings may not be possible when buildings are several miles apart or separated by natural obstacles (e.g. rivers, streams).

As a result, wireless bridges have been developed in order to provide a method of connecting two or more LANs. Bridges connect either wired or wireless networks with a physical gap between them. Wireless bridges normally offer point-to-point or point-to-multipoint connectivity for up to (approximately) 15 miles. Stated another way, a wireless bridge is a device which is physically connected to the LAN and can wirelessly transmit and receive data and other communications from other bridges connected to different LAN'S. Thus, a wireless bridge allows several LAN's to become interconnected without the need for a physical connection between LANs.

In accordance with conventional wireless networks, prior implementations of network bridges support single IEEE 802.11 radio interfaces. However, because these conventional bridges operate on a single public band radio link, they are susceptible to outages due to a variety of conditions (e.g. interference). Because conventional switches correspond to a single radio link, the corresponding data rate is greatly impacted by the limitations of the single radio link.

As well, in accordance with traditional implementations, Spanning-Tree Protocol (STP) recalculation is required to activate redundant radio links. By way of background, STP is a link management protocol that provides path redundancy while preventing undesirable loops in the network. For an Ethernet network to function properly, only one active path can exist between two LAN segments. Multiple active paths between LAN segments cause loops in the network that may result in rapid frame duplication and "network storms".

To provide path redundancy, STP defines a tree data structure that spans all switches in an extended network. STP forces certain redundant data paths into a standby (blocked) state. If one network segment in the STP becomes unreachable, or if STP costs change, the spanning-tree algorithm reconfigures the spanning-tree topology and reestablishes the link by activating the standby path. STP operation is transparent to end stations, which are unaware whether they are connected to a single LAN segment or a switched LAN of multiple segments. While transparent to end stations, the STP recalculation, or reconfiguration, makes recovery from a failed conventional wireless bridge cumbersome, slow and costly. Further, traditional wireless bridge products do not leverage or utilize catalyst switch (e.g. software/firmware/ASIC) logic.

OVERVIEW OF EXAMPLE EMBODIMENTS

In accordance with example embodiments, there is described herein a system and method for aggregating multiple radio interfaces into a single logical bridge interface.

Still other aspects of the example embodiments will become readily apparent to those skilled in this art from the following description. As it will be realized, example embodiments and their several details are capable of various modifications. Accordingly, the drawing and descriptions will be regarded as illustrative in nature and not as restrictive.

DESCRIPTION OF EXAMPLE EMBODIMENTS

The following includes examples of various embodiments and/or forms of components that fall within the scope of the present system that may be used for implementation. Although the embodiments of present system and method described herein are directed toward an IEEE 802.11 wireless network, it will be appreciated by one skilled in the art that the present concepts and innovations described herein are applicable to alternate wired and wireless networks and network protocols, without departing from the spirit and scope of the example embodiment described herein.

To establish a radio link or interface, an Ethernet switch communicates with an attached Radio Module (RM) over a logical Control Link and a logical Ethernet Link. Multiple logical Ethernet links and corresponding wireless (e.g. 802.11) links are aggregated using a port aggregation protocol (e.g. PAgP) to form a single "logical bridge interface." The aggregation enables the diversion of traffic in the event that a member link (i.e. logical Ethernet link) in an aggregated bundle is lost or fails. It will be appreciated that the link aggregation also increases the bandwidth and reliability of wireless (e.g. 802.11) bridge links. It will further be appreciated that wireless links may be separated by frequency or spatial diversity. As well, low-level point-to-point or point-to-multipoint radio links may be dynamically established in accordance with the subject protocol. In other words, multiple radio links are aggregated into a single logical bridge interface using a port aggregation protocol. For example, PAgP may be used in accordance with the present system in order to establish a single logical bridge interface. Radio links, upon establishment, are added to the aggregated bridge interface.

Radio modules (RMs) (e.g. IEEE 802.11 RMs) are attached to a wireless-enabled communications link. For exemplary purposes, the embodiments discussed herein are directed toward a Wireless-enabled Ethernet (WE) switch via an Ethernet link. Of course, alternate switches may be used with alternate LAN architectures without departing from the spirit and scope of the embodiments described herein. After connecting, Ethernet frames are bridged over an IEEE 802.11 link between an RM in a first switch and an RM in a second switch. An RM operates in "master mode" or "slave mode." Accordingly, a "master" RM may be configured to send periodic beacons while a "slave" RM scans for the beacons. This exchange prompts the communication link between the RMs.

Figure 1:
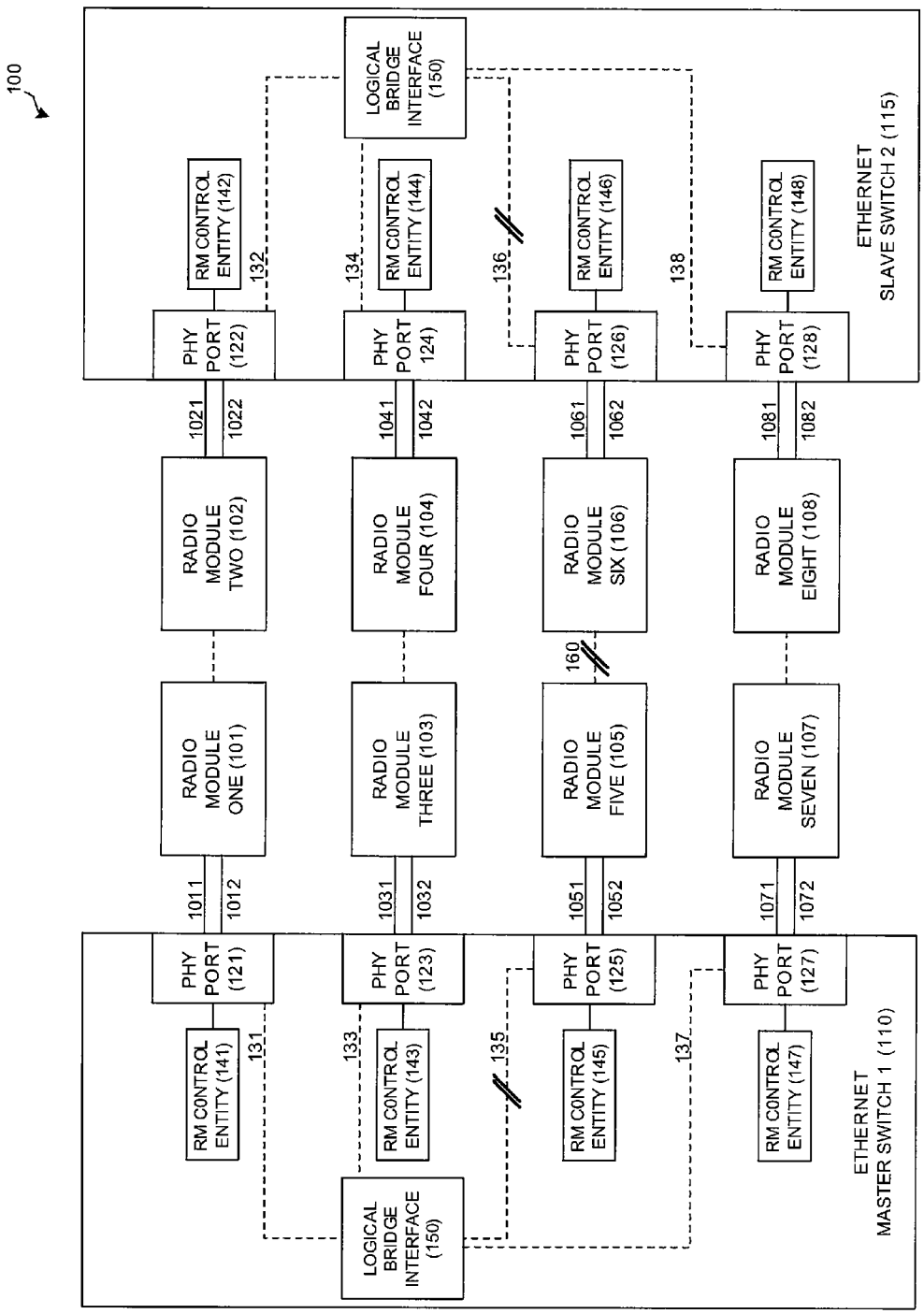
FIG. 1 illustrates an example network architectural diagram that illustrates representative network components and corresponding links in accordance with a disclosed embodiment.

Turning now to FIG. 1, an exemplary architecture 100 is shown. As shown in FIG. 1, eight (8) RMs 101-108 attached to two (2) Ethernet switches 110, 115 on physical Ethernet ports 121-128 are shown. WE switches 110 and 115 are configured with Logical Control Links, shown in FIG. 1 as reference numbers 1011, 1021, 1031, 1041, 1051, 1061, 1071, and 1081, and Logical Ethernet Links, represented by reference numbers 1012, 1022, 1032, 1042, 1052, 1062, 1072, and 1082, corresponding to each RM 101-108. Each RM-specific Logical Control Link and Logical Ethernet Link are multiplexed onto a single physical Ethernet link.

It will be appreciated that messages used for RM management and link statusing are sent over the Logical Control Links 1011, 1021, 1031, 1041, 1051, 1061, 1071, and 1081. The Logical Ethernet Links 1012, 1022, 1032, 1042, 1052, 1062, 1072, and 1082 bridge Ethernet frames between RMs 101-108. It will further be appreciated to one skilled in the art that a header, pre-pended to frames sent via a physical Ethernet link is used to distinguish between control and data frames. A logical Ethernet link is represented by an internal logical Ethernet interface 131-138 within a corresponding WE switch 110 or 115. RMs are relatively simple devices in comparison to traditional 802.11 bridges. The establishment and aggregation of logical Ethernet interfaces 131-138 are enabled by bridging and forwarding logic (e.g. 802.1D, PVST, source-learning) contained within WE switches 110 and 115.

The RMs 101-108 are physically separated from the WE switches 110 and 115 via physical Ethernet links in order to improve sensitivity. It will be appreciated that the associated RMs may be desensitized if multiple RMs, in the same radio frequency (RF) band, are contained within the same switch, even if the antennas are separated. Further, an artisan will appreciate that the radio links are isolated by "spatial separation" or "frequency separation."

As illustrated in FIG. 1, each WE switch 110 and 115 contains an RM Control Entity 141-148 corresponding to each attached RM 101-108 respectively. In operation, each RM Control Entity 141-148 sends commands and receives status information over a single logical Bridge interface from its corresponding RM 101-108.

Eight (8) RMs 101-108 are attached to two (2) Ethernet switches 110 and 115 on physical Ethernet ports. In accordance with the example, a switch has a logical RM Control Link 1011, 1021, 1031, 1041, 1051, 1061, 1071, and 1081 and a Logical Ethernet Link 1012, 1022, 1032, 1042, 1052, 1062, 1072, and 1082 corresponding to each attached RM 101-108, respectively. Each Logical Ethernet Link/Control Link pair may be multiplexed onto a single physical Ethernet link as shown.

The Logical Ethernet Interfaces 131, 132, 133, 134, 135, 136, 137, and 138 corresponding to the four (4) 802.11 links from RM1 101 to RM2 102, RM3 103 to RM4 104, RM5 105 to RM6 106, and RM7 107 to RM8 108, are aggregated in Switch 1 110 and Switch 2 115 to form a single Logical Bridge Interface 150 between Switch 1 110 and Switch 2 115. The set of member links or Logical Ethernet Interfaces 131, 132, 133, 134, 135, 136, 137, and 138 associated with the logical bridge interface 150 are referred to as an aggregation bundle. It will be understood by those skilled in the art that any known aggregation method may be used to combine member links into an aggregation bundle. For example, it will be appreciated that aggregation protocols, such as PAgP, 802.3ad or the like, function to aggregate the member links into an aggregation bundle.

The logical bridge interface 150, comprised of an aggregation bundle, appears as a single bridge interface to the Spanning Tree Protocol (STP) in the WE switches 110 and 115. An artisan will appreciate that an STP (e.g. 802.1D protocol) is used to prevent multiple bridge links between any two LAN segments. In operation, if a Logical Bridge Interface 150 is in an STP forwarding state, the aggregation protocol (e.g. PAgP) will distribute transmit frames to established member links. It will be appreciated that the PAgP hashes the MAC addresses of a transmit frame to determine the appropriate output member link.

Therefore, in accordance with the present system and method, all traffic corresponding to a single traffic stream may be directed to a common member link. Further, in the event that a single member link (e.g. 135) goes down or fails, traffic is immediately diverted to other alternate member links (e.g. 131, 133). The redirection of traffic in the event of a link failure is discussed in more detail below with reference to FIG. 2.

Figure 2:
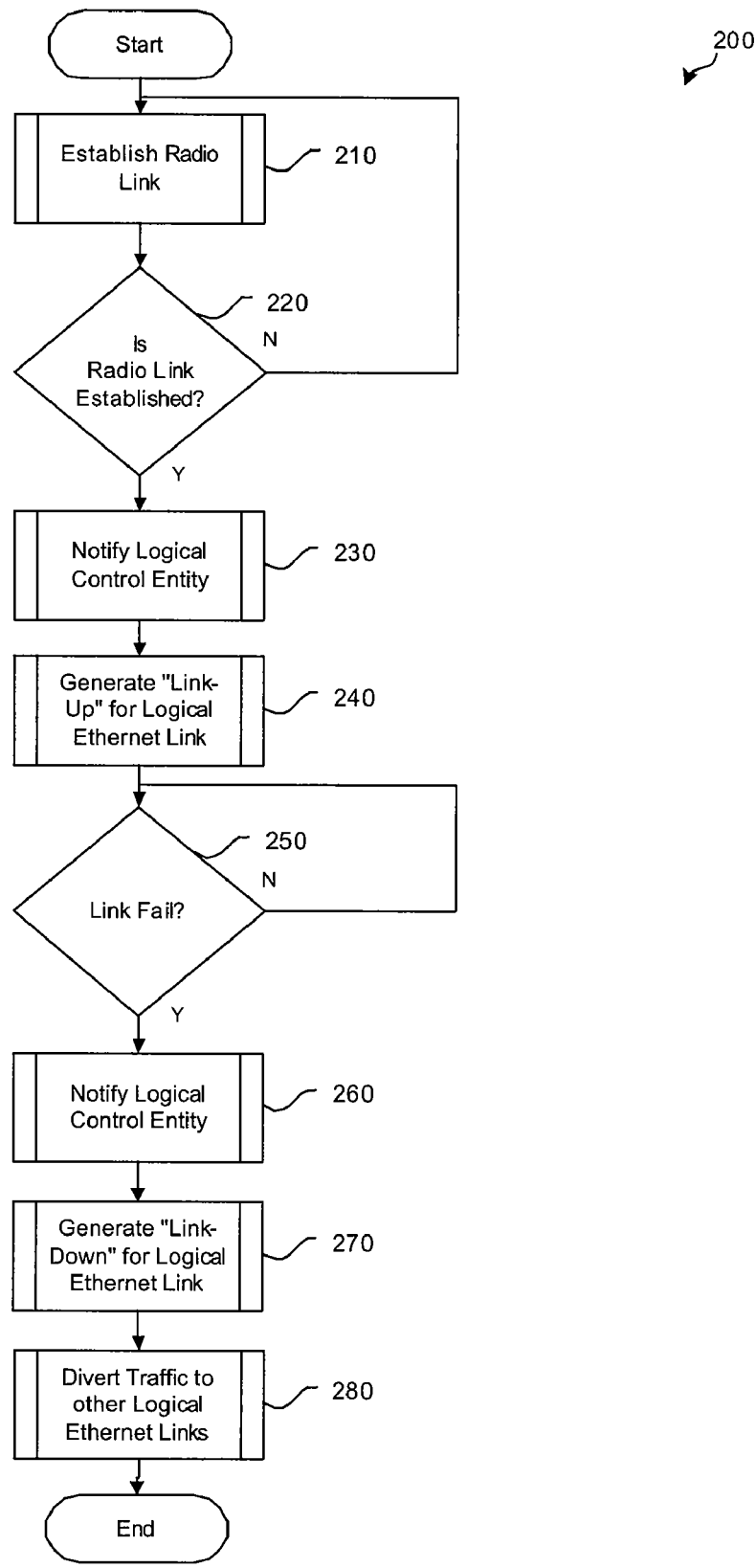
FIG. 2 illustrates a flow chart of an example methodology outlining the process steps to generate and establish "link-up" and/or "link-down" events in accordance with a disclosed embodiment.

Now with reference to FIG. 1 and FIG. 2 together, the RMs 101-108 provide link status information to their corresponding RM Control Entity 141-148. Accordingly, the RM Control Entities 141-148 generate the "link up" or "link down" events described below. It will be appreciated that the designations "link up" and "link down" are provided for discussion purposes only and are intended to describe physical and/or logical connection states of the RMs.

Referring now to FIG. 2, there is illustrated a flow chart of an embodiment of the methodology 200 for generating and establishing "link up" and/or "link down" RM events. Initially, at step 210, the system establishes a radio link in accordance with the applicable protocols and standards described above and those known in the art (e.g. IEEE 802.11). Next, the system determines at step 220 if a valid radio link is established. Upon a determination at step 220 that a valid radio link has not been established, the system returns to step 210 and again attempts to establish the radio link.

When the system determines at step 220 that a valid radio link has been established, the system notifies the corresponding RM Control Entity at step 230. For example, an RM 105 in a first switch 110 notifies the corresponding RM Control Entity 145 when a radio link is established to a peer RM 106 in a second switch 115. Upon receiving notification, the RM Control Entity generates a "link up" event for the respective Logical Ethernet Link at step 240. After receiving notification from the RM 105, the Control Entity 145 generates a "link up" event for the respective Logical Ethernet Link 135 to be linked up into the Logical Bridge Interface 150.

Next, the system determines whether or not the link has failed at step 250. When the link remains functional, as determined at step 250, the system remains idle in the "linked up" state and continues to query as shown. On the other hand, if at step 250, a determination is made that the link has failed, the corresponding Control Entity will be notified of the failure at step 260. Therefore the RM 105 notifies the corresponding Control Entity 145 in the WE switch 110 that the radio link 160 to the peer RM 106 has failed.

When such a failure has occurred, the system generates a "link down" event to disconnect the Logical Ethernet Link at step 270. In other words, the RM Control Entity 145 generates a "link down" event for the respective Logical Ethernet Link 135 to prompt the switch to immediately deactivate the corresponding WE switch port 125 thereby diverting traffic to an alternate member link or port 121 or 123, in the aggregation bundle, as shown at step 280. Thereafter, RM5 105 and RM6 106 notify their respective RM Control Entities 145 and 146 in Switch 1 110 and Switch 2 115 that the 802.11 link 160 from RM5 105 to RM6 106 has failed. In response, the respective Logical Ethernet Links 135 and 136 are deactivated in Switch 1 and Switch 2.

Next, in the event that a logical bridge interface in one WE switch is blocked by the STP, the corresponding logical bridge interface in the peer WE switch must also be blocked. In operation, if Logical Bridge Interface 150 of WE switch 115 is blocked by the STP, a control message is sent over the logical bridge interface to notify the WE switch 110 that the remote end of the logical link is in a "blocked" STP state. It will be appreciated by those skilled in the art that the STP cannot block individual member links in the aggregation bundled. The STP puts the entire logical interface 150 of WE switch 115 into a "blocked" or "forwarding" state.

In an alternate embodiment of the present system and method, the system determines the available bandwidth on the 802.11 member link which varies significantly due to sporadic interference and channel contention. In such cases, an RM Control Entity forwards flow control information to the respective PAgP entity in the WE switch to prompt the redistribution of traffic to bundle member links in proportion to the available 802.11 bandwidth on each link. It will be appreciated that wireless protocol and standards (e.g. 802.3ad) defines a marking protocol that is used to avoid reordering of frames when traffic is diverted.

Figure 3:
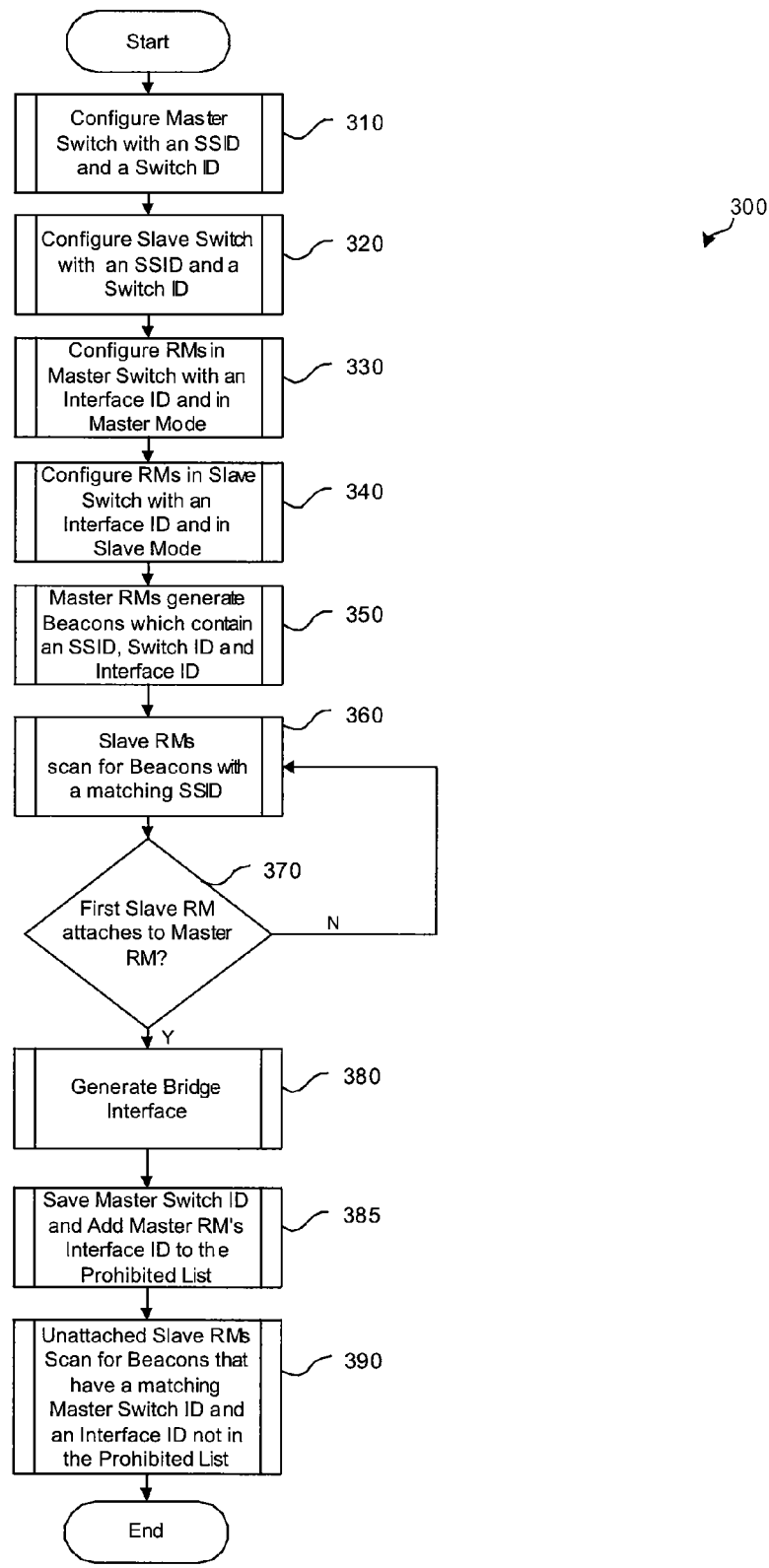
FIG. 3 illustrates a flow chart of an example methodology outlining the process steps to establish and remove interswitch point-to-point and/or point-to-multipoint links in accordance with a disclosed embodiment.

Now with reference to FIG. 3, the system is configured to establish inter-switch point-to-point and/or point-to-multipoint RM links. Referring now to FIG. 3, there is illustrated a flow chart of an embodiment of the methodology 300 for establishing inter-switch point-to-point and/or point-to-multipoint links. Initially, at step 310, a "master" switch is configured with a master switch identification (ID) and a service set identifier (SSID). It will be appreciated that a master switch is a switch that is in communication with the primary backbone network. Accordingly, at step 320, a "slave" switch is configured with a slave switch ID and SSID.

It will be appreciated that the set of master and slave RMs that form a single, logical bridge link must be contained in a single master switch and a single slave switch, respectively, to avoid inter-switch link statusing. To support point-to-multipoint links, a single master RM supports wireless links to multiple slave RMs; however, each slave RM must be in a different slave switch. Stated differently, two or more RMs in the same slave switch cannot establish a link with the same RM module in a master switch.

After configuring the SSID of the master and slave switches, the system proceeds to classify the associated RMs as either masters or slaves. As shown in FIG. 3, the RMs associated with the master switch are classified as "master" RMs at step 330, and the RMs associated with the slave switch are classified as "slave" RMs at step 340. Therefore, at block 330, the RMs on a master switch are configured in master mode thereby designating the RMs as master RMs. Likewise, RMs on a slave switch are configured in slave mode thereby designating the RMs as slave RMs at step 340. It will be appreciated that each RM is configured with an RM Interface ID to uniquely identify the RM.

In other words, a master RM may only establish a radio link with a slave RM which has a matching SSID. In the preferred embodiment, the SSID is a standard 802.11 SSID, the Switch ID is an 802.1D Bridge Address and the RM Interface ID is an 802.11 BSSID. Of course, any preferred identifiers may be used in accordance with the present system and method without departing from the spirit and scope of the subject invention.

Following configuration of the master RMs and slave RMs, at step 350 each master RM generates periodic beacons which contain the SSID, the master Switch ID and the RM Interface ID. An artisan will appreciate that the master RM transmits beacons on a single radio channel. It should be noted that a set of master RMs in switches that are wired to the primary backbone network must advertise availability to slave RMs attached to secondary Ethernet LANs. This advertising is accomplished via generation and transmission of the beacons at step 350. The beacons include the Switch ID and SSID, configured for the respective master switch, and the RM Interface ID configured for the respective RM.

In order to effectuate the linking of RMs, at step 360 an unattached slave RM scans available radio channels for the beacons sent by master RMs. Specifically, an unattached or unbound slave RM, attached to a slave switch, scans for beacons from a master RM, in a master switch having a matching SSID, which is not currently bound to a different slave RM in the same switch. Upon detecting a master beacon, the slave determines at step 370 if the master RM has a pre-established link to a slave in the same switch as the subject slave switch.

When the selected master RM has a pre-established link to a slave in the same switch as determined at step 370, the system returns the slave to scan for additional master beacons as shown at step 360. When a pre-established link is not present, as determined at step 370, the master and slave dynamically link forming a Bridge Interface at step 380. In other words, an unbound slave RM will select a master RM if the master RM has a matching SSID and the master RM has not yet established a link to another slave RM in the same slave switch. It will be appreciated by those skilled in the art that the SSIDs and other identifiers of the respective master and slave RMs are compared for compatibility. The slave RM reports its slave Switch ID and Interface ID in an association or re-association message sent to the master RM to establish a wireless link.

After a first slave RM, in a slave switch, has established a link with a first master RM, in a master switch as shown at step 380, other slave RMs in the same slave switch must establish links with other master RMs in the same master switch, to avoid operating the port aggregation protocol across multiple switches. As each RM-to-RM link is established, the RM Interface ID of the respective master RM is added to a set of prohibited Interfaces IDs at step 385. A slave RM cannot establish a link with a master RM, if the master RM's Interface ID is in the set of prohibited Interface IDs. Therefore, after a first slave RM has established a link with a first master RM, other slave RMs, in the same slave switch, only scan for master RMs that have the same Switch ID as the first RM as shown at step 390.

At this point, a Bridge Interface is created for each master/slave pair both in the master switch and in the slave switch. Upon the establishment of a master/slave radio link as described with respect to FIG. 2, the corresponding logical Ethernet interface is added to the aggregated Bridge Interface for the master/slave switch pair as previously described.

As described, an aggregation bridge interface includes a set of master RM to slave RM links whereby all master RMs are in a single master switch and all peer slave RMs are in a single slave switch.

In alternate embodiments, a single master RM is linked to multiple slave RMs so long as the multiple slave RMs are located in distinct slave switches. Thus, a logical Ethernet interface is associated in the master switch corresponding to each of the master RM's links to a slave RM.

An artisan will appreciate that a low-level protocol is used to establish an "optimal" logical master/slave switch logical bridge link. For example, a slave switch contains RMs configured to connect with master RMs in multiple master switches. The "optimal" logical bridge link is the aggregated link with the lowest "cost." It will be appreciated that the cost of an aggregated logical bridge link decreases as RM-to-RM links are added or as the bandwidth of existing RM-to-RM links increases. Further, the cost increases if RM-to-RM links are lost of if bandwidth is lost. Accordingly, in order to optimize link costs, the slave RMs in a single slave switch will advantageously select master RMs, which reduces the aggregate link cost. Sporadic changes in aggregated link cost are hidden from the higher-level STP in order to avoid frequent STP topology changes.

A master switch, with a point-to-multipoint link to multiple slave switches, must distribute a copy of a frame to each slave switch if the frame has a multicast destination address or an "unknown" unicast destination address. A master switch may send a separate copy to each slave switch or it may multicast a single copy to multiple slave switches. A master switch may use a "reliable multicast transmission protocol" to reliably deliver multicast frames to multiple slave switches.

While the embodiments have been described in considerable detail, it is not the intention of the applicant to restrict or in any way limit the scope of the appended claims to such detail. Those skilled in the art can appreciate that various changes, substitutions and alterations can be implemented without departing from the spirit and scope of the appended claims.

What is claimed is:

1. An apparatus, comprising:
   a slave switch, the slave switch comprises an associated first and second slave switch wireless modules; and
   a slave switch logical bridge interface associated with the slave switch, the slave switch logical bridge interface being in data communication with each of the first and second slave switch wireless modules, the slave switch logical bridge interface is configured to selectively route data among the first and second slave switch wireless modules;
   wherein the first slave switch wireless module is configured to receive a first connection signal from a first master switch wireless module and is configured to establish a first wireless data communication link with the first master switch wireless module broadcasting the first connection signal after receipt thereof;
   wherein the first slave switch wireless module is further configured to add the first master switch wireless module associated with a master switch to a list of prohibited interfaces to prevent another slave switch wireless module associated with the slave switch from establishing a wireless data communication link with the first master switch wireless module;
   wherein the second slave switch wireless module is configured to receive a second connection signal from a second master switch wireless module associated with the master switch and is configured to compare the second master switch wireless module associated with the second connection signal with the prohibited list;
   wherein the second slave switch wireless module is configured to establish a second wireless data communication link with the second master switch wireless module broadcasting the second connection signal after receipt thereof in accordance with the prohibited list comparison; and
   wherein the first wireless data communication link and the second wireless data communications link operate concurrently.

2. The apparatus of claim 1, wherein the slave switch logical bridge interface is configured to detect a loss of the first connection signal, and wherein the logical bridge interface is responsive to selectively redirect data for the first slave switch to the second slave switch.

3. The apparatus of claim 1, the slave switch logical bridge interface is configured to balance data flow among the first and second slave wireless switch modules.

4. The apparatus of claim 1, wherein the slave switch logical bridge interface operates with a selected port aggregation protocol.

5. The apparatus of claim 4, wherein the port aggregation protocol is an IEEE 802.1ad compatible port aggregation protocol.

6. The apparatus of claim 1, further comprising:
   the second slave switch wireless module is responsive to detecting a signal from the first master wireless module to determine whether the first master wireless module already has a connection with another wireless module associated with the slave switch; and
   the second slave switch wireless module is configured to continue scanning for a master switch wireless module that has not yet established a link with the slave switch responsive to determining the first master wireless module already has established the first wireless data communication link with the first slave switch wireless module.

7. The apparatus of claim 1, wherein the prohibited list further comprises an interface identifier associated with the master wireless module.

8. The apparatus of claim 1, further comprising:
the slave switch is configured with a slave switch identifier and a service set identifier;
wherein the first slave switch wireless module scans for a master wireless module having a matching service set identifier for establishing the first wireless data communication link; and
wherein the second slave switch wireless module scans for a master wireless module having a matching service set identifier for establishing the second wireless data communication link.

9. The apparatus of claim 8, wherein the first slave switch wireless module is configured with a first interface identifier and the second slave switch wireless module is configured with a second interface identifier.

10. The apparatus of claim 1, wherein the first wireless data communication link and second wireless data communication link are isolated by spatial separation.

11. The apparatus of claim 1, wherein the first wireless data communication link and second wireless data communication link are isolated by frequency separation.

12. An apparatus, comprising:
a master switch, the master switch including first and second master switch wireless modules; and
a master switch logical bridge interface associated with the master switch, the master switch logical bridge interface being in data communication with each of the first and second master switch wireless modules, the master switch logical bridge interface is configured to selectively route data among the first and second master switch wireless modules;
wherein the first master switch wireless module is configured to selectively broadcast a first connection signal comprising a first interface identifier that uniquely identifies the first master switch wireless module and the second master switch wireless module is configured to selectively broadcast a second connection signal comprising a second interface identifier that uniquely identifies the second master switch wireless module;
wherein the first master switch wireless module is configured to establish a first wireless data communication link with a first slave switch wireless communication module associated with a slave switch that responds to the first connection signal;
wherein the second master switch wireless module is configured to establish a second wireless data communication link with a second slave switch wireless communication module associated with the slave switch that responds to the second connection signal;
wherein the first wireless data communication link and the second wireless data communications link operate concurrently.

13. The apparatus of claim 12, further comprising the master switch is configured with a master switch identifier and a service set identifier.

14. The apparatus of claim 13, wherein the first connection signal further comprises a first beacon signal comprising the master switch identifier, the service set identifier and the first interface identifier; and
wherein the second connection signal further comprises a second beacon signal comprising the master switch identifier, the service set identifier and the second interface identifier.

15. The apparatus of claim 13, wherein the first master switch wireless module establishes the first wireless data communication link with a first slave switch wireless module having the same service set identifier; and
wherein the second master switch wireless module establishes the second wireless data communication link with a second slave switch wireless module having the same service set identifier.

16. The apparatus of claim 12, wherein the first master switch wireless module establishes a third connection with a third slave switch wireless module associated with a second slave switch; and
wherein the first master switch is operable to transmit a single copy of a multicast frame to first slave switch wireless module and the third slave switch wireless module.

17. The apparatus of claim 12, wherein the first wireless data communication link and second wireless data communication link are isolated by frequency separation.

18. The apparatus of claim 12, the master switch logical bridge interface is configured to balance data flow among the first and second master wireless switch modules.

* * * * *